(12) United States Patent
Kumar et al.

(10) Patent No.: US 7,901,641 B2
(45) Date of Patent: Mar. 8, 2011

(54) SPRAYER FOR AT LEAST ONE FLUID

(75) Inventors: Sailesh B. Kumar, Naperville, IL (US); Richard S. Hatami, Inverness, IL (US); Robert Crismyre, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 387 days.

(21) Appl. No.: 12/177,793

(22) Filed: Jul. 22, 2008

(65) Prior Publication Data

US 2010/0019061 A1   Jan. 28, 2010

(51) Int. Cl.
*B01D 19/00*  (2006.01)
*B01J 8/00*  (2006.01)
*C10G 9/18*  (2006.01)

(52) U.S. Cl. ............ 422/220; 95/149; 95/158; 422/224; 422/191; 422/194; 422/195; 261/96; 261/97; 261/110; 261/114.1; 210/97; 210/137

(58) Field of Classification Search .................... 95/149, 95/158, 185; 422/191, 194, 195, 220, 224; 261/96, 97, 110, 114.1; 210/97, 137
See application file for complete search history.

(56) References Cited

U.S. PATENT DOCUMENTS

| | | | |
|---|---|---|---|
| 3,378,349 A * | 4/1968 | Shirk | 422/194 |
| 3,524,731 A * | 8/1970 | Effron et al. | 422/220 |
| 3,542,731 A * | 11/1970 | Culbertson | 528/170 |
| 4,313,908 A | 2/1982 | Gupta | |
| 4,836,989 A | 6/1989 | Aly et al. | |
| 4,952,302 A | 8/1990 | Leach | |
| 5,158,714 A | 10/1992 | Shih et al. | |
| 5,242,577 A | 9/1993 | Betts et al. | |
| 5,403,560 A | 4/1995 | Deshpande et al. | |
| 5,688,445 A | 11/1997 | Wrisberg | |
| 5,918,637 A * | 7/1999 | Fleischman | 138/44 |
| 6,123,323 A * | 9/2000 | Yoneda et al. | 261/96 |
| 6,371,454 B1 * | 4/2002 | Gerla et al. | 261/114.1 |
| 6,669,915 B1 | 12/2003 | Boyd et al. | |
| 6,769,672 B2 | 8/2004 | Müller | |
| 6,984,365 B2 | 1/2006 | Nelson et al. | |
| 7,032,894 B2 | 4/2006 | Adusei et al. | |
| 7,112,312 B2 | 9/2006 | Chou | |
| 7,452,516 B2 * | 11/2008 | Van Hasselt et al. | 422/311 |
| 2005/0077635 A1 | 4/2005 | Van Hasselt et al. | |

FOREIGN PATENT DOCUMENTS

EP   0207673 A1   1/1987
WO   WO-2007/124328 A2   11/2007

OTHER PUBLICATIONS

Swain et al., Getting the Maximum from Hydroprocessing Reactors, PTQ, Autumn 2001, pp. 37-43.

* cited by examiner

*Primary Examiner* — Walter D Griffin
*Assistant Examiner* — Huy-Tram Nguyen
(74) *Attorney, Agent, or Firm* — Mark Goldberg

(57) ABSTRACT

One exemplary embodiment can be a sprayer for distributing at least one fluid in a vessel. The sprayer can include a first member having a first surface and a second surface forming at least one aperture there-through. Generally, the at least one aperture is skewed with respect to a substantially vertical axis passing through a center of the first member for distributing the at least one fluid in the vessel.

9 Claims, 6 Drawing Sheets

SPRAYER FOR AT LEAST ONE FLUID

FIELD OF THE INVENTION

The invention generally relates to a sprayer for at least one fluid.

DESCRIPTION OF THE RELATED ART

Various vessels can be used in chemical processing, petroleum refining, and other industries for distributing fluids, particularly a mixed-phase fluid of liquid and gas over beds or trays. One particular vessel can be a reactor, such as a trickle flow reactor, that can be used in processes such as catalytic dewaxing, hydrotreating, hydrodesulfurization, hydrofinishing, and hydrocracking. Generally, a feed, such as a fluid including one or more liquids and gases, can pass over a particulate catalyst contained in a packed bed in a downflow reactor. Chemical reactions can take place that may produce additional components in a gas phase, such as hydrogen sulfide and ammonia, in some hydrotreating processes. Such gases may separate from the liquid and rise to the top of the reactor to exit at an upper outlet. The liquid typically flows downward through the packed bed and exits a bottom outlet.

To facilitate reactions, a solid catalyst is often arrayed in a plurality of beds with a distributor plate or tray above each bed for the purpose of uniformly, effectively, and efficiently distributing the fluid at the top of the bed.

Generally, trays can be provided with distributors to provide an equally divided flow across the underlying bed. However, these distributors can suffer from shortcomings when, for example, ideal conditions are not presented and an unequal distribution of liquid occurs. As an example, non-ideal distribution conditions can exist during the start-up of a unit, e.g., after maintenance is conducted. These non-ideal conditions can lead to an inefficient wetting of the catalyst bed below the distributor. This uneven wetting can create hotspots in the catalyst bed leading to one or more pockets of shortened catalyst life. In addition, an uneven flow of liquid can create channeling through the bed. As a consequence, it is desirable to provide a distributor that provides better and consistent wetting of the underlying catalyst bed to avoid these shortcomings and extend the catalyst life.

SUMMARY OF THE INVENTION

One exemplary embodiment can be a sprayer for distributing at least one fluid in a vessel. The sprayer can include a first member having a first surface and a second surface forming at least one aperture there-through. Generally, the at least one aperture is skewed with respect to a substantially vertical axis passing through a center of the first member for distributing the at least one fluid in the vessel.

Another exemplary embodiment can be a vessel for distributing at least one fluid. The vessel may include a distributor and a packed bed including a plurality of particles positioned below the distributor. In addition, generally the distributor includes a tray forming at least one void, a conduit coupled to the tray about the void and passing there-through; and a sprayer coupled proximate to a bottom end of the conduit. Furthermore, the sprayer may include a first member forming a plurality of diverging apertures there-through, and having a first surface and a second surface.

A further exemplary embodiment may be a process for distributing at least one hydrocarbon fluid. The process can include passing the at least one hydrocarbon fluid through a conduit to a sprayer. What is more, the sprayer can include a first member forming a plurality of diverging apertures, and having a first surface and a second surface.

The embodiments disclosed herein can provide a sprayer that can prevent hot spots and channeling in a packed bed by providing a consistent and sufficient liquid distribution. The sprayer can have several design features that can be adapted to provide a suitable spray for a particular vessel. As such, multiple sprayers may provide overlap and redundancy should a sprayer become inoperable by, e.g., plugging. In addition, the increased effectiveness of the sprayer can reduce the number of sprayers required for a particular vessel. Thus, the improved sprayer may extend catalyst life by preventing hot spots or channeling that can reduce the life of the catalyst and/or make the reactor less effective.

DEFINITIONS

As used herein, the term "fluid" can mean one or more gases and/or one or more liquids.

As used herein, the term "gas" can mean a single gas or a solution of a plurality of gases. In addition, the term "gas" may include a solution or a suspension, e.g., a vapor or an aerosol, of one or more liquid particles and/or one or more solid particles, of the same or different substances, in one or more gases.

As used herein, the term "liquid" can mean a single liquid, or a solution or a suspension of one or more liquids with one or more gases and/or solid particles.

As used herein, the terms "absorbent" and "absorber" include, respectively, an adsorbent and an adsorber, and relates, but is not limited to, absorption, and/or adsorption.

As used herein, the term "rich" can mean an amount generally of at least about 50%, and preferably about 70%, by mole, of a compound or class of compounds in a stream.

As used herein, the term "perimeter" generally means a boundary of an object or region, and can be of any suitable shape, such as a circle, oval, square, diamond, rectangle, or irregular.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

DETAILED DESCRIPTION

Figure 1:
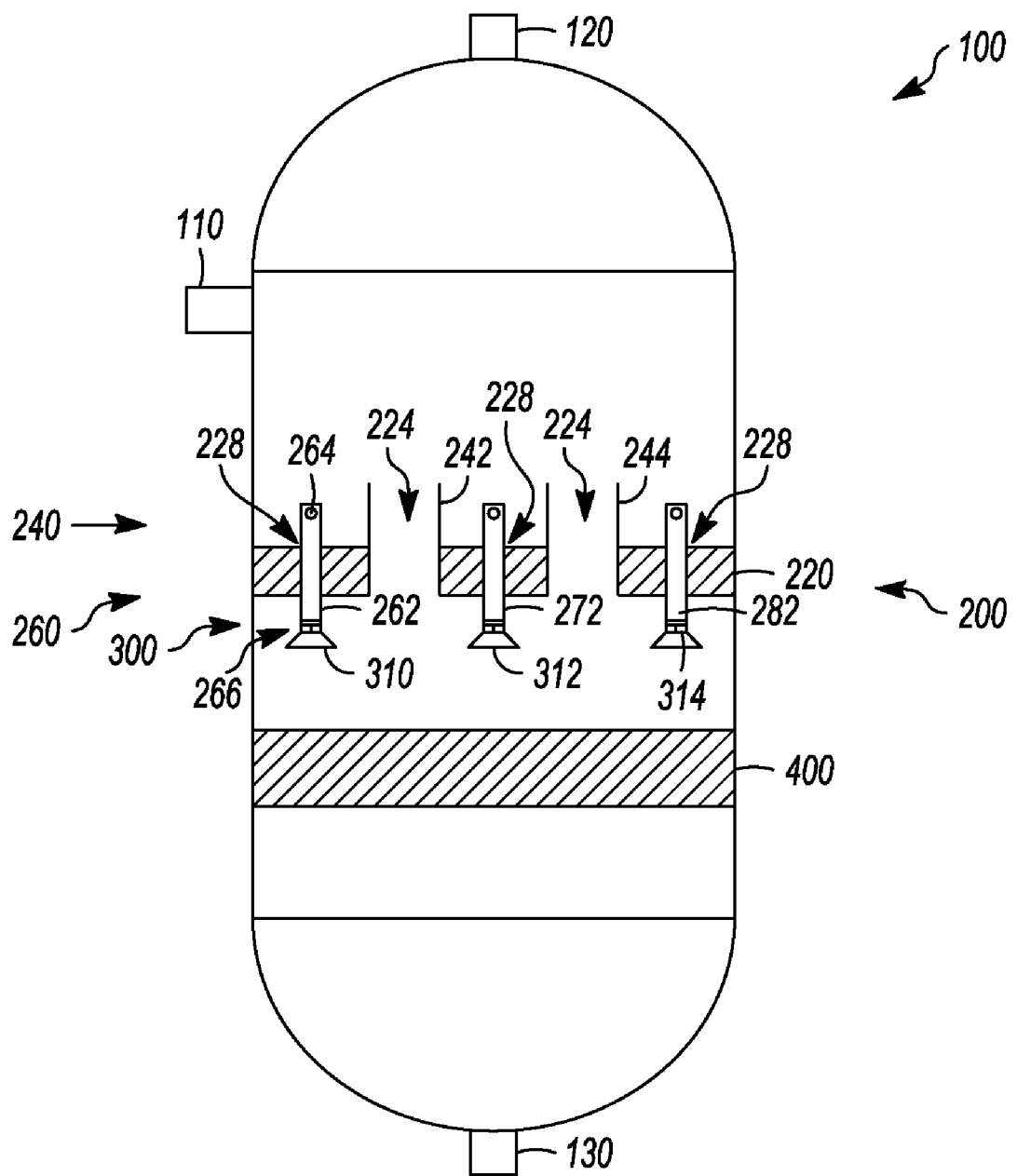
FIG. 1 is an elevational, side view of an exemplary vessel.
Figure 2:
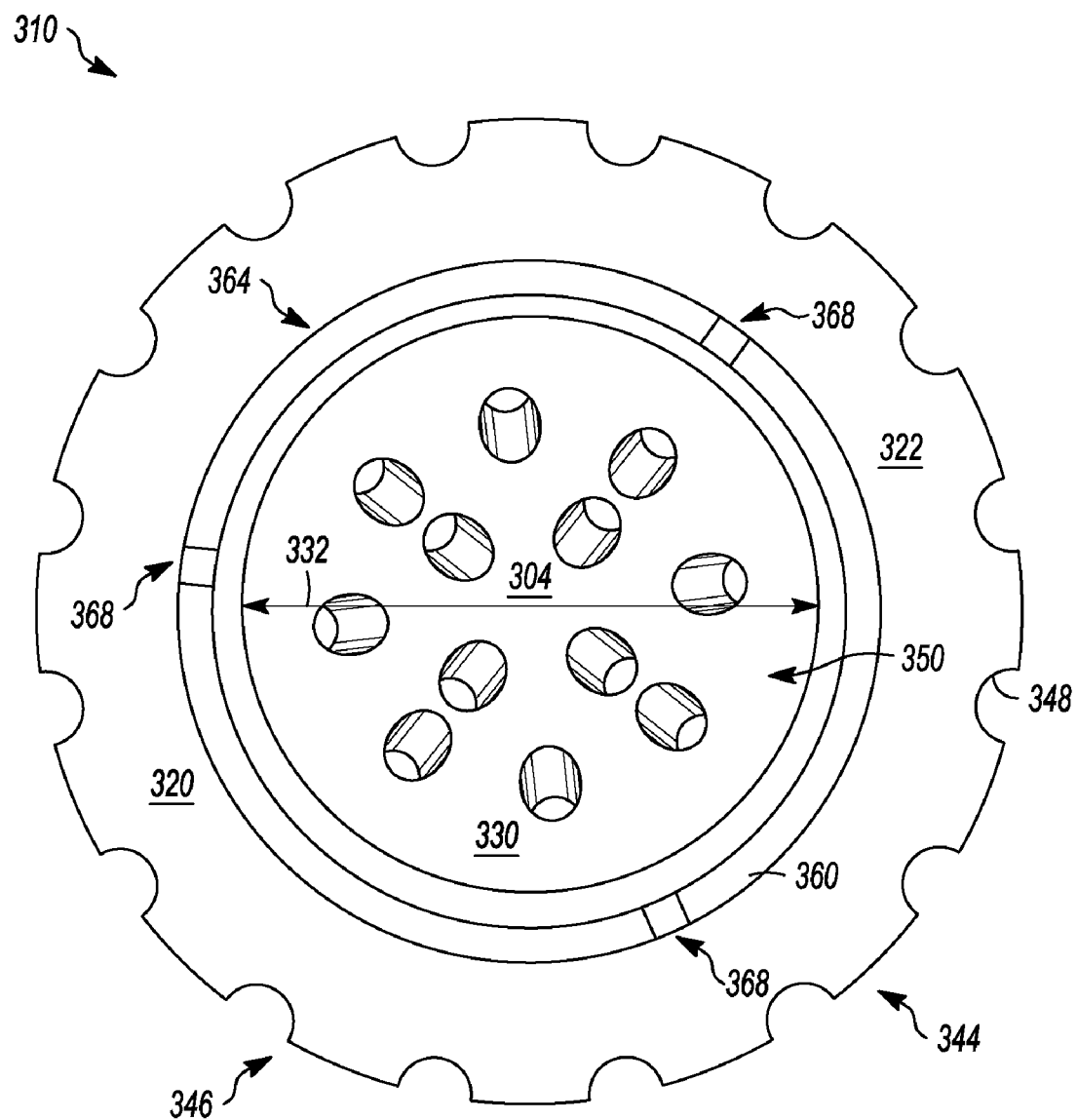
FIG. 2 is a top, plan view of an exemplary sprayer.
Figure 3:
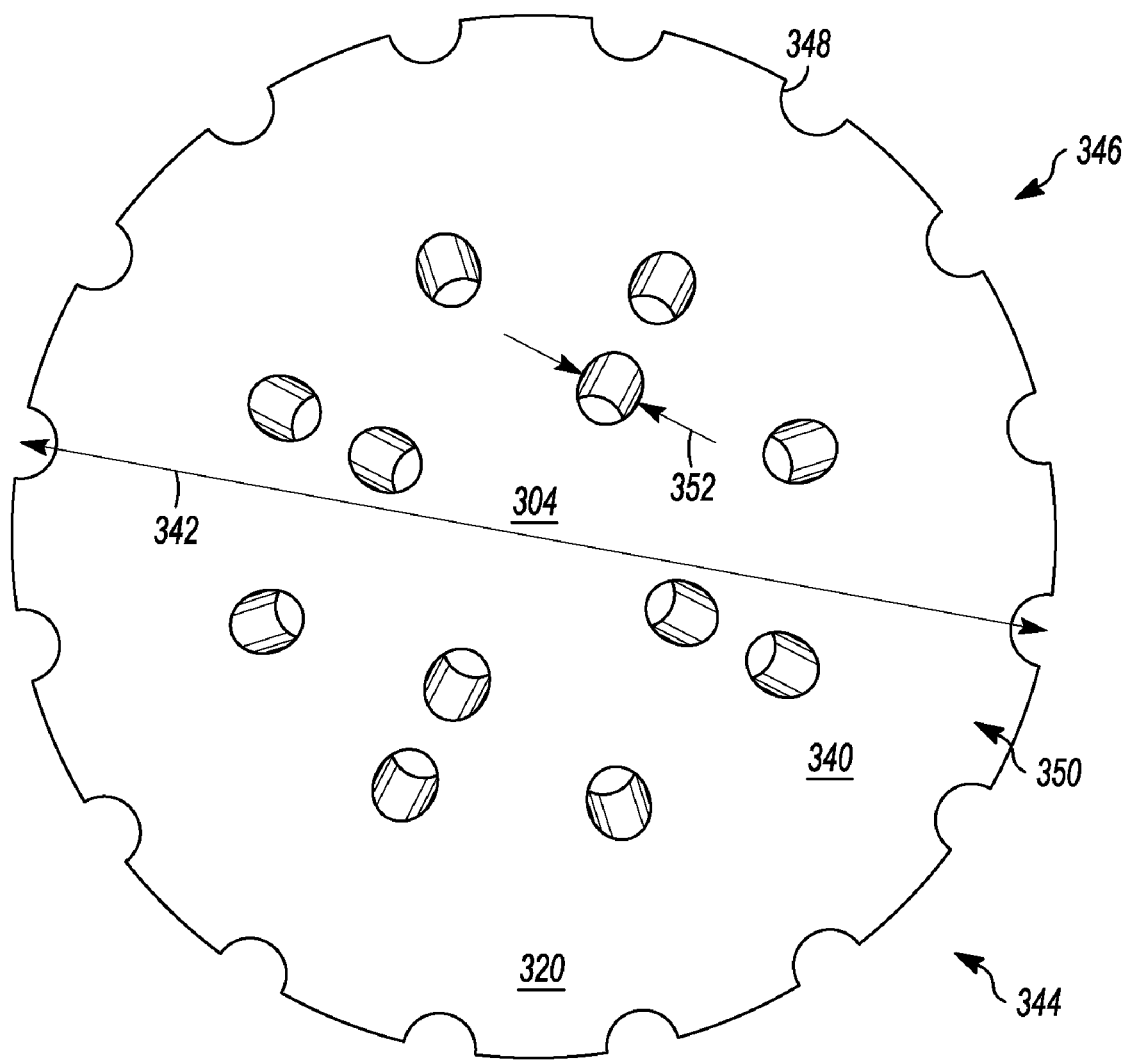
FIG. 3 is a bottom, plan view of the exemplary sprayer.
Figure 4:
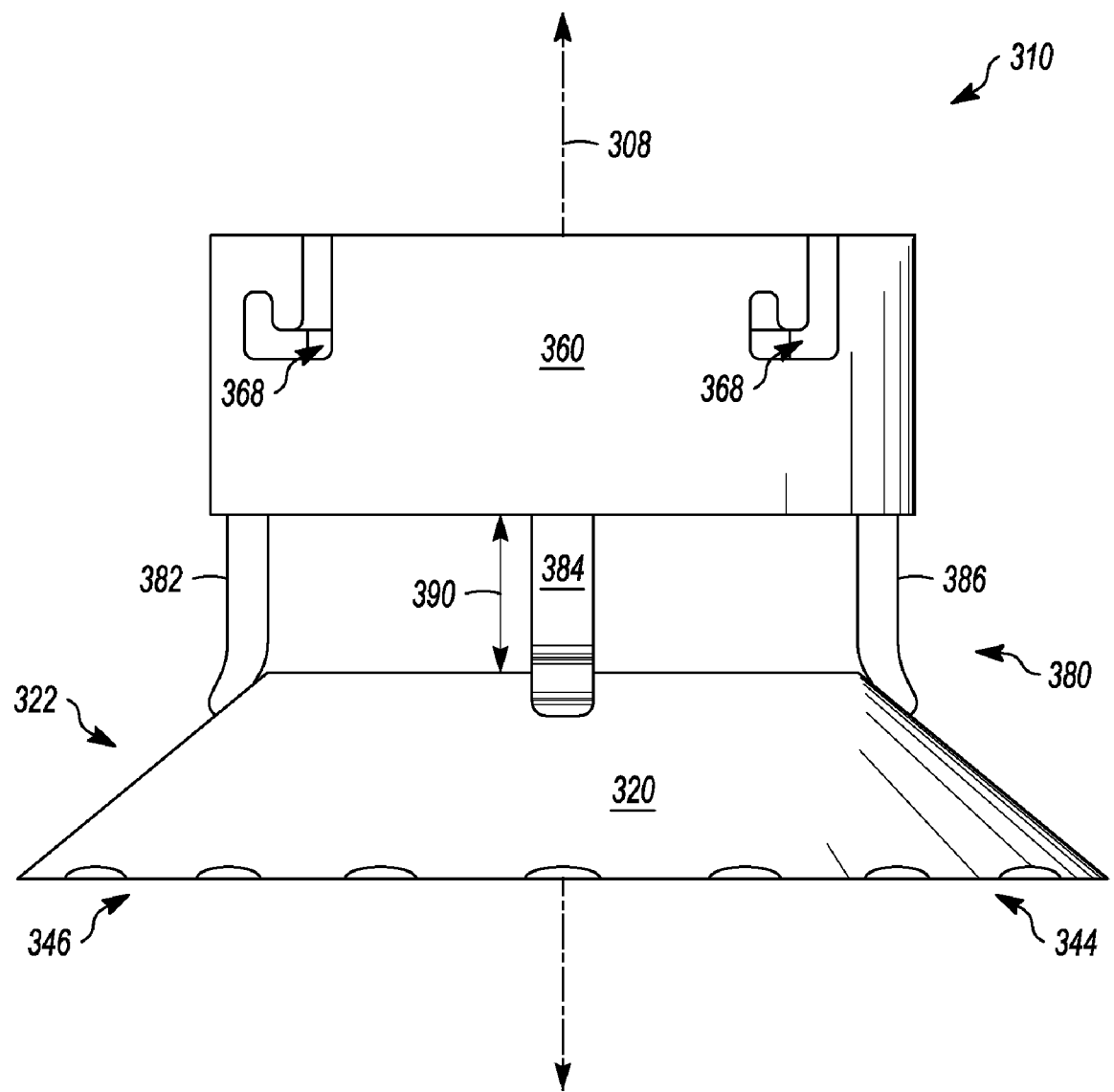
FIG. 4 is a side, elevational view of the exemplary sprayer.
Figure 5:
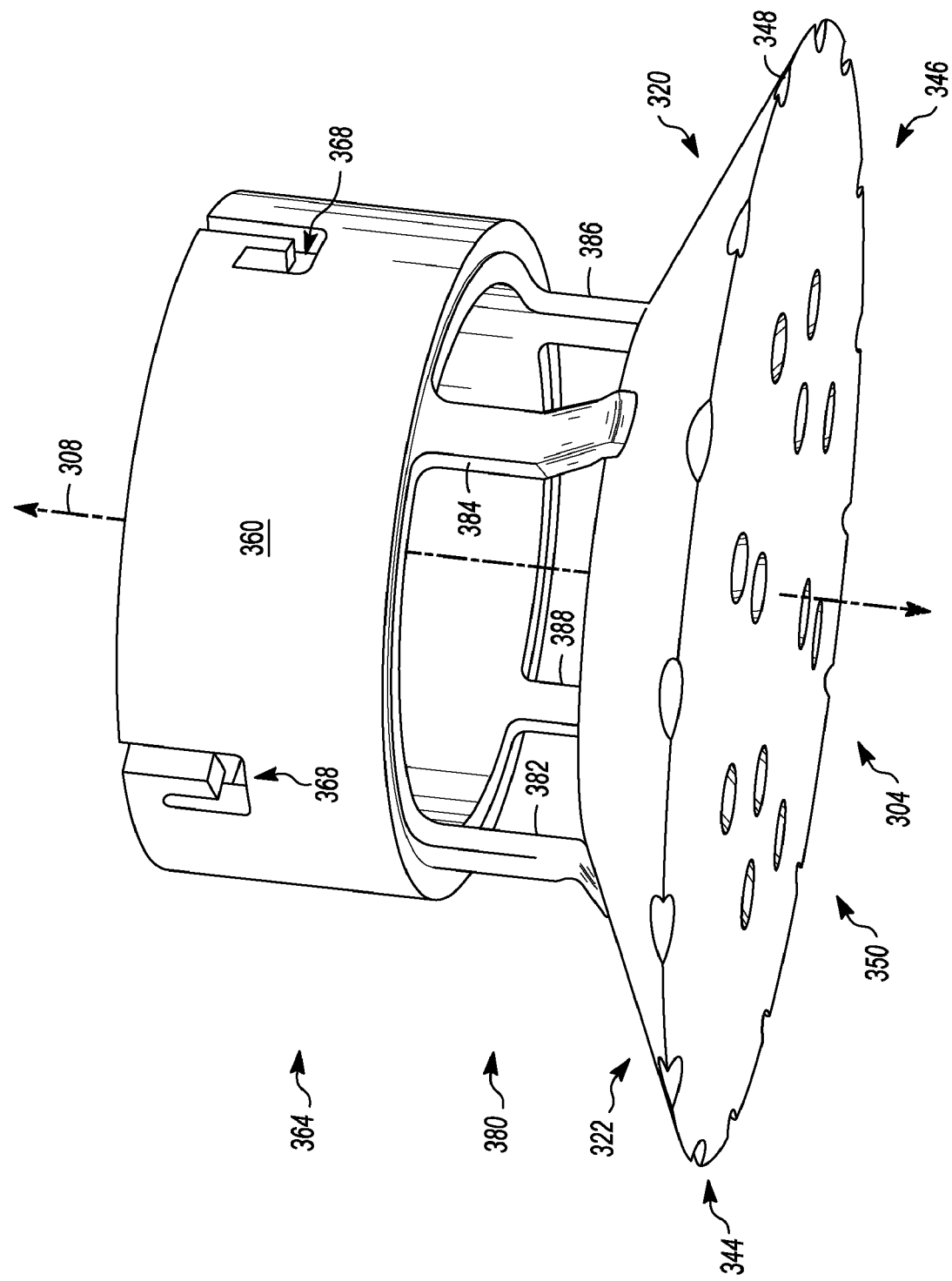
FIG. 5 is an elevational, side view of the exemplary sprayer.

Referring to FIG. 1, a vessel 100 is depicted having an inlet 110, a first outlet 120, and a second outlet 130. The vessel 100 can receive a feed. The feed can be a fluid, including a liquid or a mixed-phase fluid, such as one or more liquids and gases, through the inlet 110. Generally, the vessel can distribute the feed in the vessel containing a fixed bed of particles, such as a catalyst. Although a reactor is disclosed herein, it should be understood that other types of vessels such as an absorber or a mass transfer vessel can also use the embodiments disclosed herein, and other materials can be contained instead of or in addition to the catalyst, such as an absorbent.

The vessel 100 can include a distributor 200 and a packed bed 400 of particles, such as a catalyst. The distributor 200 can include a tray 220 forming at least one opening 224 and at least one void 228. Although only one tray 220 and one packed bed 400 are depicted in this exemplary embodiment, it should be understood that the vessel 100 can contain any number of trays 220 and packed beds 400. In addition, although a feed is discussed as being distributed, any stream or fluid may be distributed, including intermediate streams internal to the vessel 100 or recycled streams. Generally, the distributor 200 further includes at least one riser 240 and at least one conduit or downcomer 260 that allows the passage of a fluid, such as a liquid or a mixed-phase fluid therethrough. In this exemplary embodiment, two risers 240 and three downcomers 260 are depicted, although any number of risers 240 and/or downcomers 260 can be utilized. The at least one riser 240 can include a first riser 242 and a second riser 244 and the at least one downcomer 260 can include a first downcomer 262, a second downcomer 272, and a third downcomer 282. Generally, one or more gases rise through the risers 240, and one or more fluids, including a fluid rich in one or more liquids, flow downward through the downcomers 260. The risers 240 and the downcomers 260 may be spaced apart in order to minimize disturbance of a liquid film flow or a spray by interaction with a rising gas flow.

The vessel 100 in exemplary embodiments can be adapted for co-current or counter-current flow. In one exemplary embodiment, the gas and liquid can be in a co-current downward flow, such as a hydrotreating vessel. In such an instance, the risers 240 can be integrated with the downcomers 260 as a single unit, and the gas and liquid can descend to the packed bed 400. Alternatively, the risers 240 can be omitted and the gas and liquid can flow downward through the downcomers 260.

As depicted herein, generally the risers 240 surround a respective opening 224 and the downcomers 260 surround a respective void 228 in the tray 220. The downcomers 260 can include a respective sprayer 300. Particularly, each downcomer 262, 272, and 282 can include a respective first sprayer 310, a second sprayer 312, and a third sprayer 314. Generally, the distribution and density of the downcomers 260 are such that the liquid films or droplet sprays from neighboring downcomers 260 overlap. Therefore, the downcomers 260 are preferably evenly distributed over the tray 220. As an example, the distributor 200 can have at least 25 downcomers 260 per square meter of tray 220.

The downcomers 260 and corresponding sprayers 300 can be the same or different, but in this exemplary embodiment each downcomer 260 and each sprayer 300 can be substantially similar to, respectively, other downcomers 260 and sprayers 300. As such, only downcomer 262 and its respective sprayer 310 are described in greater detail herein.

The downcomer 262 can form an opening 264 and have a bottom end 266. The downcomer 262 can have a generally tubular or cylindrical shape, but it should be understood that the downcomer 262 can be any suitable shape, such as prism-shaped. Generally, the feed flows from the inlet 110 to the tray 220, which is substantially horizontal. The liquid collected on the tray 220 can rise and enter the opening 264 and pass downward through the sprayer 310 to the packed bed 400 below the tray 220.

Referring to FIGS. 1-5, the first sprayer 310 can include a center 304, a substantially vertical axis 308, a first member 320, a second member 360, and at least one leg or plurality of legs 380. Typically, the first member 320 is spaced apart from the second member 360. The first member 320 can have a shape of a frustum 322 and have a first surface 330 and a second surface 340. Generally, the first surface 330 and the second surface 340 are substantially parallel, and have respectively, a diameter 332 and a diameter 342. The second surface 340 can form a perimeter 344. Generally, the perimeter 344 can be substantially circular 346, but can be any suitable shape such as rectangular or square. The substantially circular perimeter 346 can form a serrated edge 348 to aid the distribution of, e.g., a feed. However, it should be understood that the serrated edge 348 can take other shapes to aid the distribution of liquid. Typically, the first member 320 forms at least one aperture 350 there-through, preferably a plurality of diverging apertures 350, with respect to the substantially vertical axis 308. In this preferred embodiment, the first member 320 forms twelve apertures 350, although the first member 320 may form any number of apertures 350. Usually, each aperture 350 can be skewed with respect to the substantially vertical access 308, and may be substantially circular and have a diameter 352. The skewed apertures 350 can be, independently, the same or different. The skewed apertures 350 may aid in the dispersion of a liquid. In addition, the diameter of the first member 320 can be a function of the diameter and the pitch of downcomers of the tray 220. The ratio of the diameter 342 of the second surface 340 of the first member 320 to the diameter 352 of one of the at least one aperture 350 can be about 10:1-about 45:1, preferably about 20:1-about 25:1. In this exemplary embodiment, the diameter 332 of the first surface 330 to the diameter 342 of the second surface 340 can be about 1:1.1-about 1:4, preferably about 1:1.5-about 1:3, and optimally about 1:2.

The second member 360 can be a substantially cylindrical shape 364, although the second member 360 can form any suitable shape, and form at least one slot 368. In this exemplary embodiment, the second member 360 can form three slots 368, although any number of one or more slots 368 can be formed. Each slot 368 can be, independently, the same or different, but are preferably the same. Typically, the second member 360 is adapted to couple the bottom end 266 of the downcomer 262. Particularly, the downcomer 262 can have one or more screws or other type of mechanical fastener projecting from its bottom end 266 that is received within a respective slot 368 for coupling of the sprayer 310 thereto. Alternatively, the second member 360 can couple the downcomer 262 using any suitable means, such as welding.

In addition, at least one leg or plurality of legs 380 can couple the first member 320 and the second member 360. Preferably, the plurality of legs 380 can include a first leg 382, a second leg 384, a third leg 386, and a fourth leg 388, although any number of one or more legs 380 can be utilized. Each leg 380 can have a respective length 390, and may be the same or different. Typically, the first member 320, the second member 360, and the plurality of legs 380 are formed integrally together by any suitable means, such as welding. The length 390 of a single leg 380 to a diameter 342 of the second surface 340 can have a leg length:diameter ratio of about 1:2-about 1:15, preferably about 1:5-about 1:10, and optimally about 1:7.

Generally, the spray device 310 is designed to couple with any suitable downcomer 262. Particularly, the sprayer 310 can be coupled onto several kinds of downcomers. Moreover, the sprayer 310 may be designed to minimize the pressure drop through the downcomer, while discharging a dispersed spray of liquid droplets. The unique geometric features of the sprayer 310, such as the frustum-shaped first member 320, the serrated edge 348, and the diverging plurality of apertures 350, can facilitate the dispersion of liquid without substantially increasing the pressure. In addition, generally the frustum 322 shape of the first member 320 further aids the dispersion of liquid. This combination of features may ensure the spread and dispersion of a fluid to the packed bed 400 below. The dimensions of the first member 320, the number of apertures 350 and their angular orientation, the number of serrations along the serrated edge 348, and the diameter and angle of the frustum 322 can all be designed to optimize spray patterns to overlap the spray of neighboring sprayers for obtaining a sufficient liquid distribution, even in the event of a sprayer becoming dysfunctional due to, e.g., plugging. Thus, these dimensions can be designed to provide a broad distribution of an umbrella-shaped film or spray.

In operation, the feed collected on the tray 220 may rise and pass through the opening 264 of the downcomer 262. Afterwards, the fluid can enter the first sprayer 310 proximate to the second member 360. The first member 320 is spaced apart from the second member 360 so the fluid can fall freely to the first surface 330 of the first member 320. As a result, the fluid can gain momentum, and upon impingement, the fluid may form a broad film or droplet spray. The overlapping of films and/or sprays from neighboring sprayers can provide a high uniformity of distribution.

EXAMPLES

The following examples are intended to further illustrate the disclosed embodiments. These illustrations of the embodiments are not meant to limit the claims to the particular details of these examples. These examples can be based on engineering calculations and actual operating experience with similar processes.

The following experiment can demonstrate the effectiveness of the sprayer disclosed herein by quantitatively measuring the spatial spread of a fluid, such as a liquid, dispersed from the sprayer. The discharged liquid can be collected over a specified area underneath the sprayer. Discharge fractions may be collected in subdivided areas and used to assess the effectiveness of the sprayer.

Figure 6:
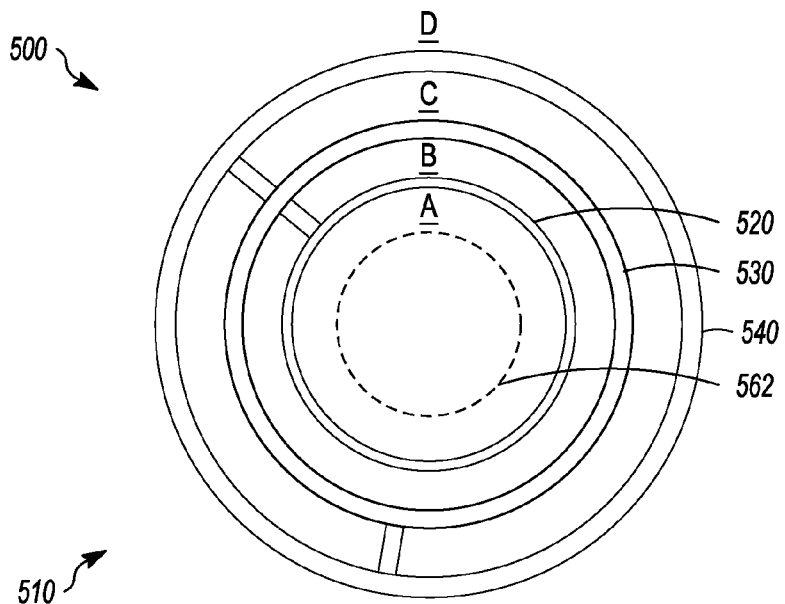
FIG. 6 is a schematic, top, and plan view of an exemplary collection device.

Referring to FIG. 6, a collection apparatus 500 can be positioned underneath a tubular downcomer 562 depicted in phantom. The collection apparatus 500 can be one or more tubes 510 including three concentric tubes 520, 530, and 540 of generally incrementally increasing diameter placed directly underneath the downcomer 562. The tube 520 has a 13 centimeter (cm) diameter and fashioned from a schedule 40 pipe, the tube 530 has a 20 cm diameter and fashioned from a schedule 80 pipe, and the tube 540 has a 25 cm diameter and fashioned from a schedule 40 pipe. Each tube 510 can be 46 cm long to provide a collection volume. These tubes 510 create four zones, namely a Zone A inside the tube 520, a Zone B between the tubes 520 and 530, a Zone C between the tubes 530 and 540, and a Zone D outside the tube 540. The collection area for each of the Zones A, B, and C is about 130 square cm. The lower end of each tube 510 can be closed by a plate forming three discharging orifices corresponding to each of the Zones A, B, or C. The orifices can be calibrated to discharge a certain amount of liquid, e.g. water, depending on the head of the collected water inside each Zone A, B, or C. The flow rates can be calculated by measuring the height of the water in each Zone A, B, or C by means of a differential pressure gauge connected to pressure ports on the lower end of each respective tube 510.

The distributor setting on a tray has a triangular pitch of about 11 cm. The spray from the downcomer may extend beyond the outermost tube 540. The amount of water in Zone D is calculated by subtracting the amounts of water in Zones A-C from the amount of water passed through the downcomer 562.

It is generally desired that a downcomer provides an even distribution of a fluid so that the amounts collected in Zones A, B, C, and D are about equal. Thus, the even distribution of a fluid, such as water, in all four zones would generally be a preferred characteristic of a downcomer.

Figure 7:
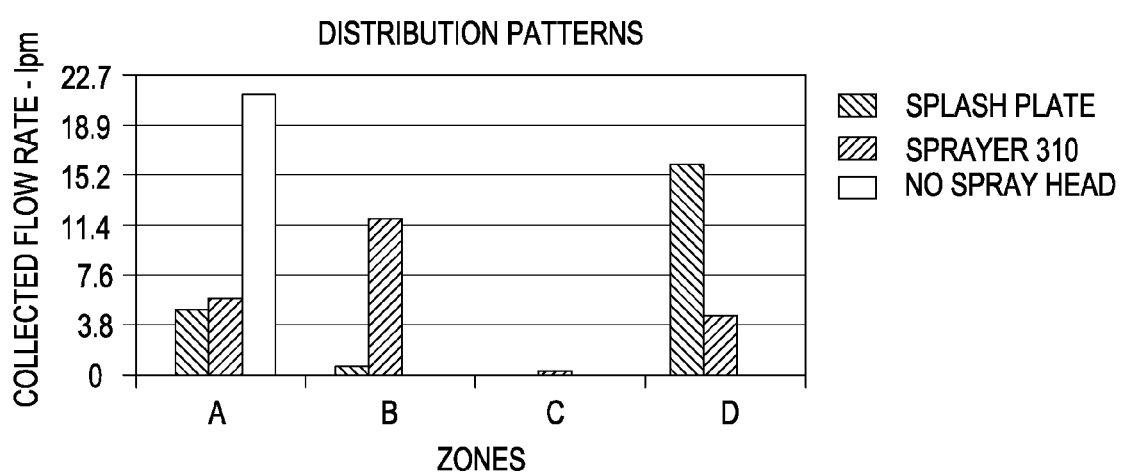
FIG. 7 is a graphical depiction comparing distribution patterns.

Referring to FIG. 7, distribution patterns are compared of a splash plate coupled to the downcomer 562, a sprayer 310 as depicted in FIGS. 1-5 coupled to the downcomer 562, and the downcomer 562 with no terminal sprayer. The splash plate can be connected to a cuff and spaced about 1.5 cm from the cuff's lower end. The splash plate can be circular in shape having a smooth edge and with a diameter of about 11 cm. The splash plate can form 37 evenly-spaced non-diverging holes, i.e. parallel, to a perpendicular axis, and each hole can have a diameter of about 0.5 cm. The second surface 340 of the sprayer 310 can have a diameter of about 11 cm. Approximately equal amounts of water are provided in the downcomer 562 for testing with the splash plate, the sprayer 310, and no sprayer. As depicted in FIG. 7, the collected flow rate in liters per minute (lpm) is compared at each zone for the downcomer 562 having the splash plate, the sprayer 310, and no sprayer. The splash plate distributes liquid in a pattern that is reminiscent of an umbrella, namely a central stream in zone A and droplets dispersed into zone D. There is little or no distribution in zones B and C. The sprayer 310 provides more evenly spaced distribution over the space continuum, with relatively significant amounts in Zones A, B, and D and a small amount in Zone C. The downcomer 562 absent a sprayer distributes almost all the water in Zone A.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A sprayer for distributing at least one fluid in a vessel comprising a first member having a first surface and a second surface forming at least one aperture therethrough wherein the at least one aperture is skewed with respect to a substantially vertical axis passing through a center of the first member for distributing the at least one fluid in the vessel wherein the first surface and the second surface are substantially parallel and wherein the second surface forms a serrated edge about a perimeter.

2. The sprayer according to claim 1, wherein the perimeter is substantially circular.

3. A sprayer for distributing at least one fluid in a vessel comprising:

a) a first member having a first surface and a second surface forming at least one aperture therethrough wherein the at least one aperture is skewed with respect to a substantially vertical axis passing through a center of the first member for distributing the at least one fluid in the vessel; and b) a second member coupled to the first member wherein the first and second members are spaced apart, and wherein the second member is substantially cylindrically shaped.

4. The sprayer according to claim 3, wherein the second member forms at least one slot.

5. The sprayer according to claim 4, further comprising at least one leg coupling the first member to the second member.

6. The sprayer according to claim 5, further comprising a plurality of legs.

7. The sprayer according to claim 6, wherein the at least one aperture comprises a plurality of apertures wherein the plurality of apertures diverges from the axis.

8. The sprayer according to claim 7, wherein the second surface of the first member forms a serrated edge about a perimeter.

9. A vessel for distributing at least one fluid comprising:
a) a distributor wherein the distributor comprises:
   i) a tray forming at least one void;
   ii) a conduit coupled to the tray about the void and passing therethrough; and
   iii) a sprayer coupled proximate to a bottom end of the conduit wherein the sprayer comprises a first member forming a plurality of diverging apertures therethrough and comprising a first surface and a second surface wherein the first surface and the second surface are substantially parallel, and the second surface forms a serrated edge about a perimeter; and
b) a packed bed comprising a plurality of particles positioned below the distributor.

* * * * *